United States Patent
Fujishiro

(10) Patent No.: US 12,028,761 B2
(45) Date of Patent: Jul. 2, 2024

(54) CELL RESELECTION METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 326 days.

(21) Appl. No.: 17/454,175

(22) Filed: Nov. 9, 2021

(65) Prior Publication Data

US 2022/0070745 A1     Mar. 3, 2022

Related U.S. Application Data

(63) Continuation of application No. PCT/JP2020/019340, filed on May 14, 2020.

(30) Foreign Application Priority Data

May 16, 2019 (JP) ................. 2019-093195

(51) Int. Cl.
 H04W 36/00     (2009.01)
 H04W 28/08     (2023.01)
 H04W 76/27     (2018.01)

(52) U.S. Cl.
CPC .  *H04W 36/00835* (2018.08); *H04W 28/0838* (2020.05); *H04W 36/0007* (2018.08); *H04W 36/0061* (2013.01); *H04W 76/27* (2018.02)

(58) Field of Classification Search
None
See application file for complete search history.

(56) References Cited

U.S. PATENT DOCUMENTS

2020/0351818 A1*  11/2020  Park ........................ H04W 4/90

OTHER PUBLICATIONS

Intel Corporation; "Efficient RRC State Transitions"; 3GPP Tsg Ran WG2 Meeting #105; R2-1900722; Feb. 25 - Mar. 1, 2019; pp. 1-3; Athens, Greece.
CATT, "RNA Update and Configuration," 3GPP TSG-RAN WG2 Meeting #98, R2-1704241, May 15-19, 2017; pp. 1-2; Hangzhou, China.
3rd Generation Partnership Project; Technical Specification Group Radio Access Network; NR; NR and NG-RAN Overall Description; Stage 2 (Release 15); 3GPP TS 38.300 V15.3.0, Sep. 2018; pp. 1-92; 3GPP Organizational Partners.
Huawei, HiSilicon; "Cell reselection for Inactive UEs"; 3GPP TSG~Ran WG2 Meeting AH-1807; R2-1810747; Jul. 2-6, 2018; pp. 1-3; Montreal, Canada.
Ericsson; "Inter-Frequency Reselection Rules for RNA/Registration Area Stickiness"; 3GPP TSG~RAN WG2 #101 bis; R2-1804729; Apr. 16-20, 2018; pp. 1-2; Sanya, China.

* cited by examiner

*Primary Examiner* — Kenneth B Wells
(74) *Attorney, Agent, or Firm* — Studebaker & Brackett PC

(57) ABSTRACT

A cell reselection method is a method that allows a user equipment to perform cell reselection of reselecting a cell to be used as a serving cell. The cell reselection method includes: transitioning from an RRC connected state to an RRC inactive state when a message is received from a network, the message including a configuration of a RAN notification area in which paging for the user equipment is performed; and after the transitioning to the RRC inactive state, selecting, among cells included in the RAN notification area, a redistribution target configured with a highest priority in the cell reselection, based on the RAN notification area configured according to the message and a redistribution parameter broadcast from the network.

10 Claims, 8 Drawing Sheets

CELL RESELECTION METHOD AND USER EQUIPMENT

RELATED APPLICATIONS

The present application is a continuation based on PCT Application No. PCT/JP2020/019340, filed on May 14, 2020, which claims the benefit of Japanese Patent Application No. 2019-093195 filed on May 16, 2019. The content of which is incorporated by reference herein in their entirety.

TECHNICAL FIELD

The present disclosure relates to a cell reselection method and a user equipment used for a mobile communication system.

BACKGROUND ART

In Long Term Evolution (LTE) of the 3rd Generation Partnership Project (3GPP), which is a standardization project of a mobile communication system, inter frequency redistribution has been standardized (for example, see NPL 1).

According to the inter frequency redistribution, when a large number of user equipments camp on a specific carrier frequency, some of the user equipments can be transferred from the specific carrier frequency to another carrier frequency through cell reselection, thus allowing a load sharing between carrier frequencies.

In recent years, a 5G system which is a mobile communication system of the fifth generation has been attracting attention. In the 5G system, a radio resource control (RRC) inactive state is introduced as a new RRC state of a user equipment.

CITATION LIST

Non Patent Literature

NPL 1: 3GPP Technical Specification "TS 38.300 V15.3.0" September 2018, Internet <URL: http://www.3gpp.org/ftp//Specs/archive/38_series/38.300/38300-f30.zip>

SUMMARY

A cell reselection method according to a first aspect is a method that allows a user equipment to perform cell reselection of reselecting a cell to be used as a serving cell. The cell reselection method includes: transitioning from an RRC connected state to an RRC inactive state when a message is received from a network, the message including a configuration of a RAN notification area in which paging for the user equipment is performed; and after the transitioning to the RRC inactive state, selecting, among cells included in the RAN notification area, a redistribution target configured with a highest priority in the cell reselection, based on the RAN notification area configured according to the message and a redistribution parameter broadcast from the network.

A user equipment according to the second aspect is an apparatus that performs cell reselection of reselecting a cell to be used as a serving cell. The user equipment includes a controller configured to cause the user equipment to transition from an RRC connected state to an RRC inactive state when the user equipment receives from a network a message including a configuration of a RAN notification area in which paging for the user equipment is performed. After the transition to the RRC inactive state, the controller selects, among cells included in the RAN notification area, a redistribution target configured with a highest priority in the cell reselection, based on the RAN notification area configured according to the message and a redistribution parameter broadcast from the network.

DESCRIPTION OF EMBODIMENTS

Figure 1:
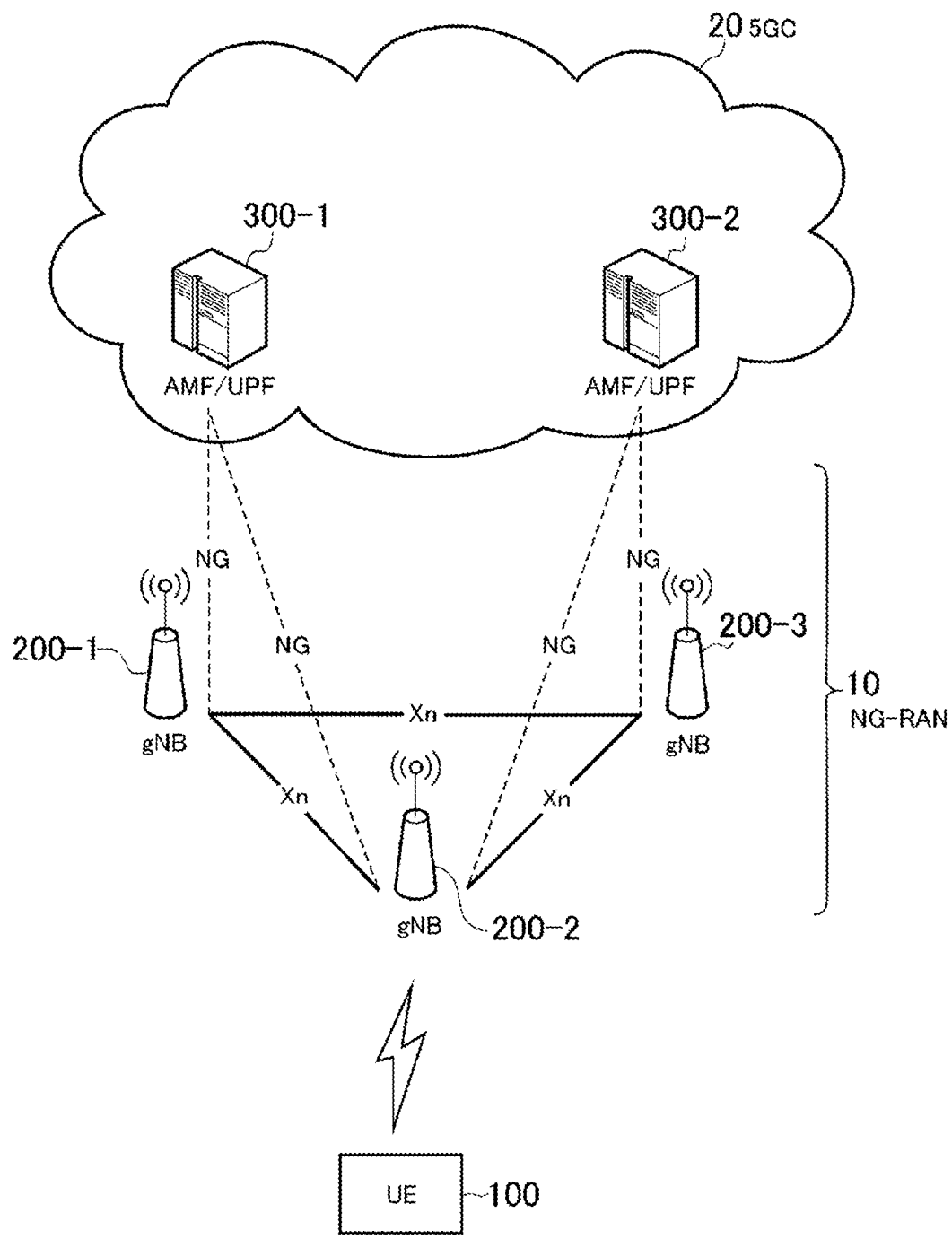
FIG. 1 is a diagram illustrating a configuration of a mobile communication system according to an embodiment.

In the 5G system, the inter frequency redistribution described above has not yet been introduced. However, when it is assumed that the inter frequency redistribution is introduced in the 5G system, the existing inter frequency redistribution does not take the RRC inactive state into consideration, and thus the inter frequency redistribution may not appropriately function.

In view of this, the present disclosure has an object to cause the inter frequency redistribution in the RRC inactive state to appropriately function.

A mobile communication system according to an embodiment will be described with reference to the drawings. In the description of the drawings, the same or similar parts are given the same or similar reference numerals.

Mobile Communication System First, a configuration of a mobile communication system according to an embodiment will be described. Although the mobile communication system according to the embodiment is a 5G system of the 3GPP, LTE may be at least partially applied to the mobile communication system.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus as long as the UE is used by a user. Examples of the UE 100 include, for example, a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
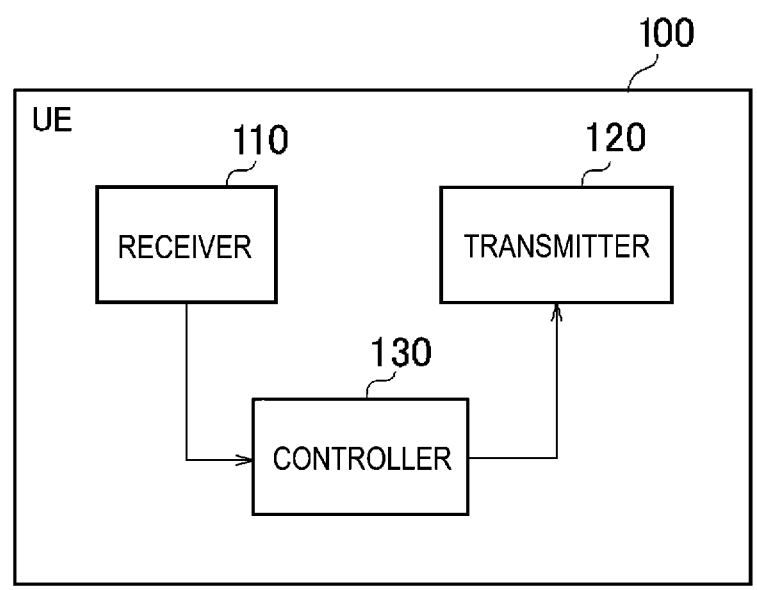
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various kinds of processes.

Figure 3:
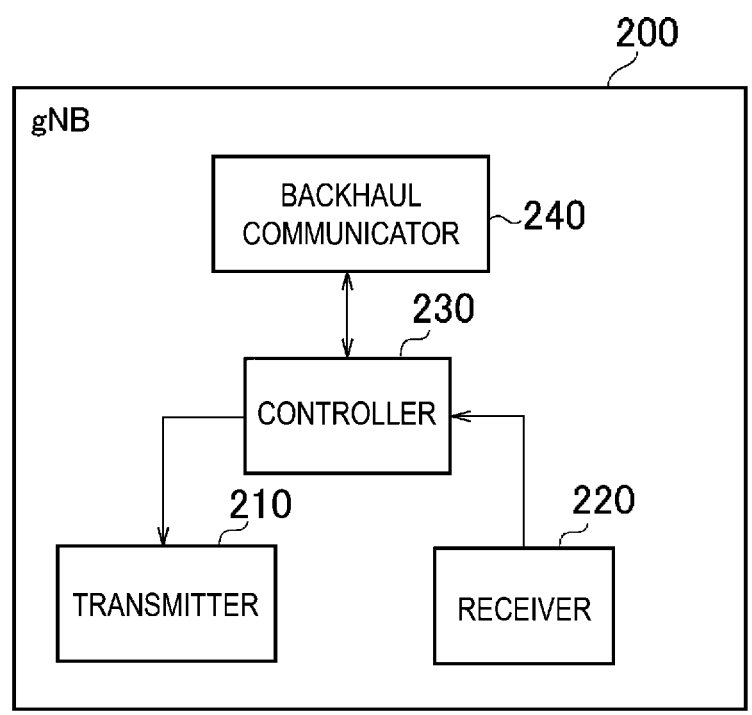
FIG. 3 is a diagram illustrating a configuration of a base station according to the embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
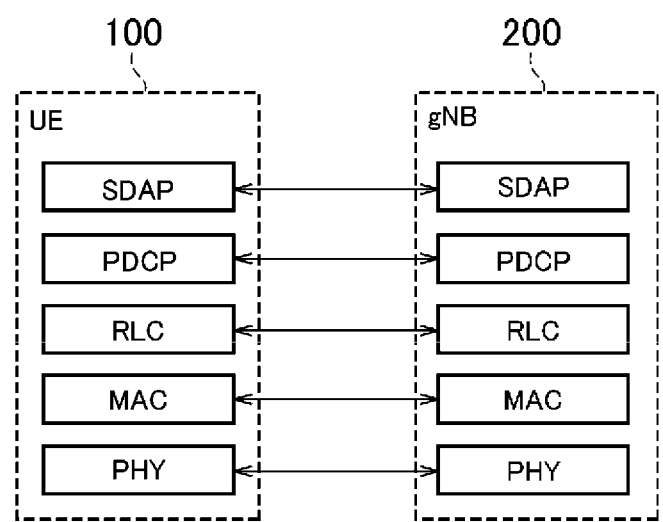
FIG. 4 is a diagram illustrating a configuration of a radio interface protocol stack in a user plane according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 5:
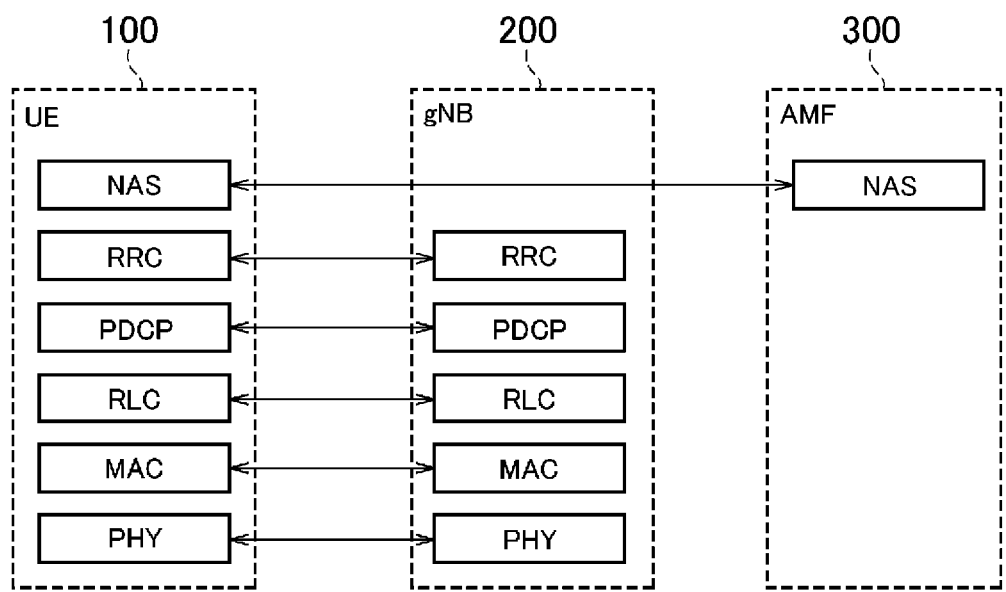
FIG. 5 is a diagram illustrating a configuration of a radio interface protocol stack in a control plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Cell Reselection

Next, cell reselection will be described.

The UE 100 in the RRC idle state or the RRC inactive state performs cell reselection. The UE 100 measures a reception state of each of a serving cell and neighboring cells to enable a reselection process. The UE 100 already recognizes neighboring frequencies to search for and measure a neighboring frequency different from the serving frequency being a carrier frequency to which the serving cell belongs.

The UE 100 performs cell reselection based on the measurement results for each of the serving cell and the neighboring cells to determine a cell that the UE is to camp on (a serving cell).

Here, the UE 100 performs cell reselection at the same carrier frequency (intra-frequency) as the serving frequency by ranking the cells according to their reception states. Specifically, the UE 100 selects the top ranked cell.

The UE 100 performs cell reselection at a carrier frequency (inter frequency) different from the serving frequency based on the priorities of carrier frequencies. Such frequency priorities are configured, for example, by the gNB 200 for the UE 100. The UE 100 attempts to camp on the highest priority carrier frequency available for the UE 100. Note that, for neighboring frequencies with an equal priority to that of the serving frequency, the UE 100 may perform cell reselection by ranking the cells according to the reception states.

In a typical cell reselection, the UE 100 measures the reception states of the neighboring cells when initiation conditions are satisfied and selects a cell to be used as the serving cell from among the cells satisfying selection conditions.

First, the initiation conditions are as shown below.

(A1) Carrier frequency having priority higher than priority of the carrier frequency of the current serving cell:

The UE 100 constantly measures quality of the carrier frequency having high priority.

(A2) Carrier frequency having priority equal to or lower than priority of the carrier frequency of the current serving cell:

When quality of the current serving cell falls below a predetermined threshold, the UE 100 measures quality of the carrier frequency having equal priority or lower priority.

Second, the selection conditions are as shown below.

(B1) Priority of the carrier frequency of a neighboring cell is higher than priority of the current serving cell:

The UE 100 selects a cell that satisfies a relationship of Squal>ThreshX, HighQ over a predetermined period (TreselectionRAT), or a cell that satisfies a relationship of Srxlev>ThreshX, HighP over the predetermined period (TreselectionRAT). Here, Squal is a value corresponding to the received quality of a desired wave, and Srxlev is a value corresponding to received power of the desired wave.

(B2) Priority of the carrier frequency of a neighboring cell is the same as priority of the current serving cell:

The UE 100 calculates a ranking Rs of the current serving cell and a ranking Rn of the neighboring cell. The UE 100 selects a cell having the ranking Rn higher than Rs over the predetermined period (TreselectionRAT).

(B3) Priority of the carrier frequency of a neighboring cell is lower than priority of the current serving cell:

The UE 100 selects a target cell among neighboring cells with a method similar to that of (B1) described above on the assumption that Squal<ThreshServing, LowQ is satisfied over the predetermined period (TreselectionRAT), or Srxlev<ThreshServing, LowP is satisfied over the predetermined period (TreselectionRAT).

Inter Frequency Redistribution

Next, inter frequency redistribution will be described.

Cell reselection in inter frequency can be performed based on redistribution priority, separately from the frequency priority configured from the network (gNB 200) to the UE 100.

The UE 100 may be redistributed to a redistribution target (carrier frequency or cell), based on the redistribution priority. The UE 100 considers that the redistribution target (carrier frequency or cell) has the highest priority (specifically, priority higher than any other frequency priorities configured from a network) over a certain period. A redistribution parameter is included in system information broadcast by the gNB 200. Such inter frequency redistribution includes a one-shot trigger method triggered by paging transmitted from the gNB 200 and a continuous trigger method triggered every time a timer expires.

According to such inter frequency redistribution, when a large number of UEs 100 camp on a specific carrier frequency, a part of the UEs 100 can be transferred from the specific carrier frequency to another carrier frequency, and therefore a load between carrier frequencies can be distributed.

RRC Inactive State

Next, the RRC inactive state will be described.

The RRC inactive state is similar to the RRC idle state in that public land mobile network (PLMN) selection, acquisition of system information, and cell reselection are performed. The RRC inactive state is similar to the RRC connected state in that connection for the UE 100 is established between the NG-RAN 10 and the 5GC 20, and that an access stratum (AS) context of the UE 100 is held in the NG-RAN 10 and the UE 100.

In contrast, regarding paging, the 5GC 20 starts paging in the RRC idle state, whereas the NG-RAN 10 starts paging in the RRC inactive state. A RAN notification area (RNA) being an area in which paging started by the NG-RAN 10 is performed is configured for the UE 100 by the NG-RAN 10, and is managed by the NG-RAN 10. Further, regarding paging discontinuous reception (DRX), the 5GC 20 configures a DRX cycle in the RRC idle state, whereas the NG-RAN 10 configures the DRX cycle in the RRC inactive state.

The RNA is an area configured by at least one cell. The UE 100 in the RRC inactive state can move within the RNA without giving notification to the NG-RAN 10. However, the UE 100 in the RRC inactive state is required to start RNA update processing when the UE 100 exits from the configured RNA.

When a reception gNB receives an RNA update request from the UE 100, the reception gNB acquires a UE context from the last serving gNB that has transitioned the UE 100 to the RRC inactive state on the Xn interface. The reception gNB determines whether or not to bring the UE 100 back to the RRC inactive state, transition the UE 100 to the RRC connected state, or transition the UE 100 to the RRC idle state.

Configuration methods of the RNA include 1) a method in which the gNB 200 configures a list of at least one cell (specifically, a list of cell identifiers) constituting the RNA for the UE 100, and 2) a method in which the gNB 200 configures a list of RAN areas for the UE 100. In the method in which the list of RAN areas is configured for the UE 100, at least one RAN area identifier is provided for the UE 100. Here, the RAN area is a subset of tracking areas, or is equal to a tracking area. Each cell broadcasts one or a plurality of RAN area identifiers in the system information.

Operation According to Embodiment

Next, operation according to the embodiment will be described.

When it is assumed that inter frequency redistribution is introduced in the 5G system, it is desirable that inter frequency redistribution be possible for load distribution regarding the RRC inactive state as well.

However, the UE 100 in the RRC inactive state is required to start RNA update processing when the UE 100 exits from the configured RNA. As a result, the UE 100 accesses the gNB 200 for the RNA update processing, and exchange of the UE context occurs between the gNBs, and thus the load of each of the UE 100 and the gNB 200 is increased.

Thus, according to an embodiment, in inter frequency redistribution in the RRC inactive state, the UE 100 performs cell reselection within the range of the configured RNA, and thereby causes the inter frequency redistribution in the RRC inactive state to appropriately function.

A cell reselection method according to an embodiment is a method in which the UE 100 performs cell reselection of reselecting a cell to be used as a serving cell. The cell reselection method includes a step of transitioning from the RRC connected state to the RRC inactive state, in response to reception of a message (for example, an RRC release message) including a configuration of the RNA in which paging for the UE 100 is performed, from a network. Further, the cell reselection method includes a step of, after transitioning to the RRC inactive state, selecting the redistribution target configured with the highest priority in the cell reselection among cells included in the RNA, based on the RNA configured by the message and a redistribution parameter broadcast from the network.

With this configuration, when the UE 100 performs inter frequency redistribution in the RRC inactive state, the UE 100 can perform cell reselection within the range of the configured RNA.

Figure 6:
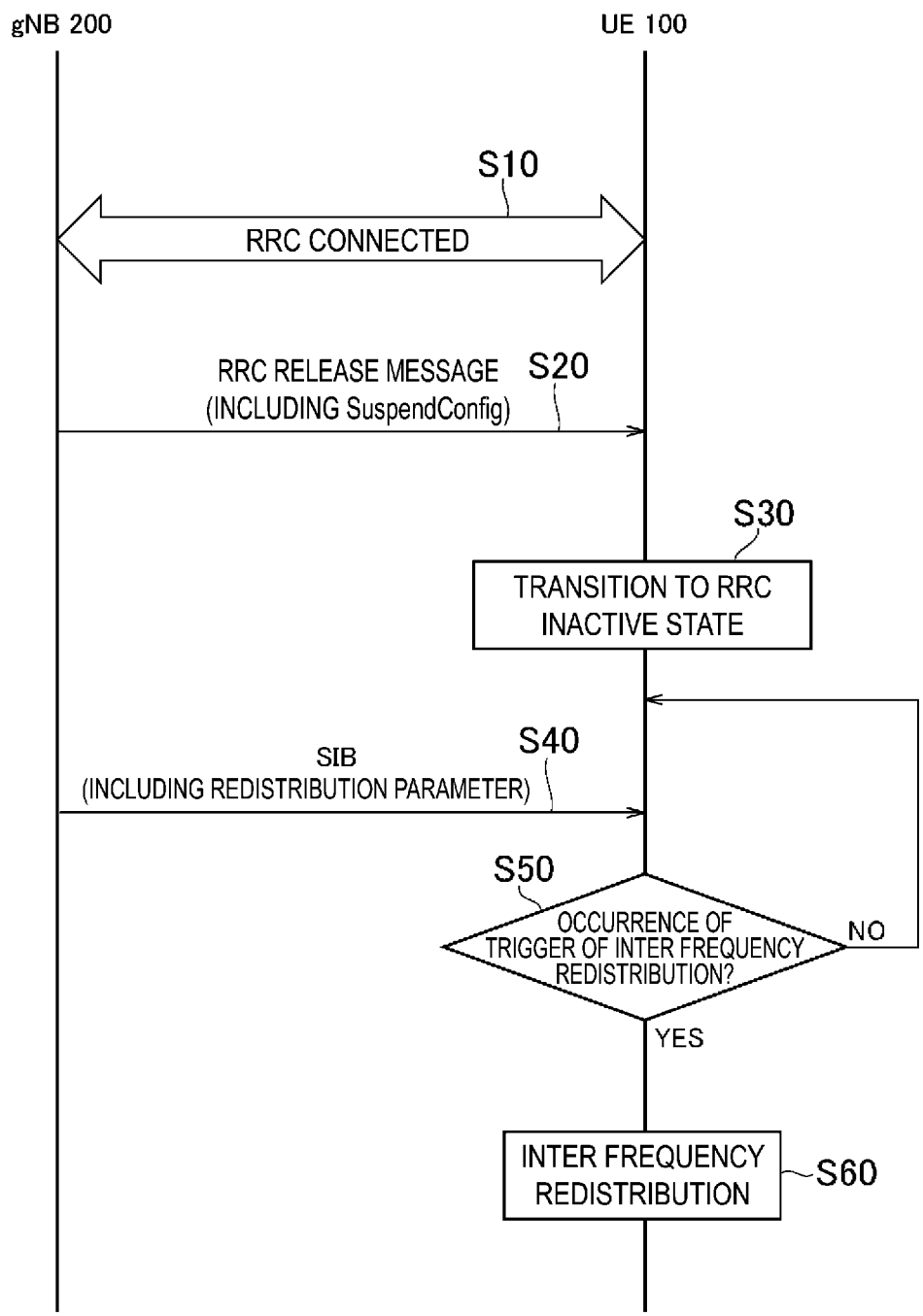
FIG. 6 is a diagram illustrating an operation sequence according to an embodiment.

FIG. 6 is a diagram illustrating an operation sequence according to an embodiment.

As illustrated in FIG. 6, in Step S10, the UE 100 is in the RRC connected state in a cell of the gNB 200.

In Step S20, the UE 100 receives an RRC release message from the gNB 200. The RRC release message is a type of dedicated RRC message (unicast RRC message). In an embodiment, the gNB 200 includes configuration information (SuspendConfig) of an RRC inactive mode in the RRC release message. SuspendConfig includes a configuration of the RNA. As described above, the configuration of the RNA includes a list of cell identifiers of cells constituting the RNA, or a list of identifiers of the RAN area. Further, SuspendConfig includes ran-PagingCycle being a discontinuous reception (DRX) cycle for the RRC inactive mode, and an I-RNTI (fullI-RNTI or shortI-RNTI) being an identifier allocated to the UE 100 for the RRC inactive mode.

In Step S30, the UE 100 transitions from the RRC connected state to the RRC inactive state according to reception of the RRC release message including SuspendConfig.

In Step S40, the UE 100 in the RRC inactive state acquires the redistribution parameter included in the system information (System Information Block (SIB)) broadcast from the gNB 200.

For example, the gNB 200 transmits the redistribution parameter with SIB type A and SIB type B. An inter frequency redistribution parameter of the redistribution parameter corresponds to RedistributionInterFreqInfo included in SIB type B. RedistributionInterFreqInfo is defined for each neighboring frequency of a neighboring frequency list (InterFreqCarrierFreqList). Note that SIB type B is an SIB including information related to inter frequency cell reselection.

Figure 7:
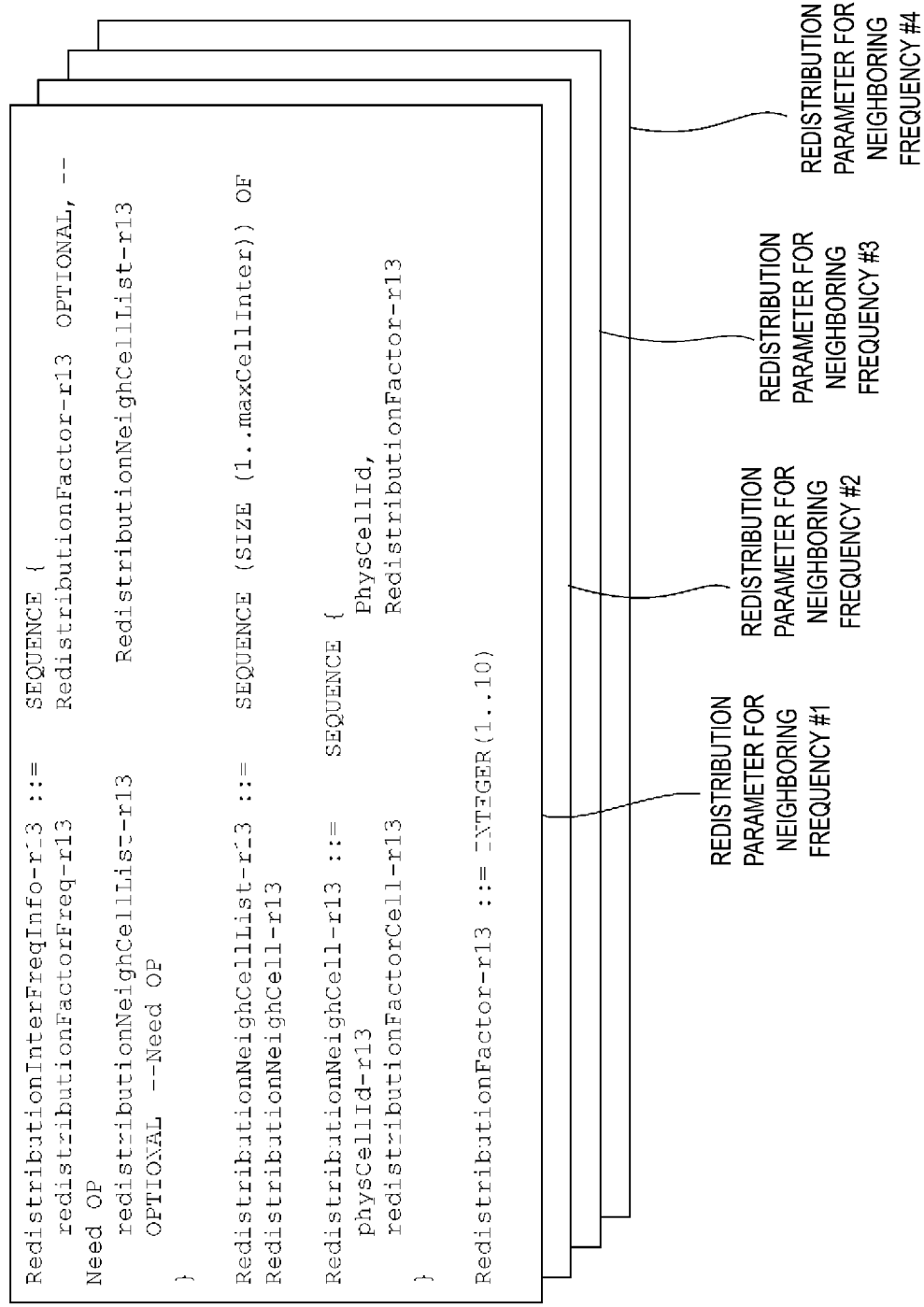
FIG. 7 is a diagram illustrating inter frequency redistribution parameters according to an embodiment.

FIG. 7 is a diagram illustrating the inter frequency redistribution parameters (RedistributionInterFreqInfo). In each information element illustrated in FIG. 7, "-r13" means "being introduced in 3GPP specification release 13"; however, the notation is omitted in the following description.

As illustrated in FIG. 7, RedistributionInterFreqInfo is provided for each neighboring frequency among the neighboring frequency list (InterFreqCarrierFreqList). RedistributionInterFreqInfo includes a parameter (redistributionFactorFreq) that determines the probability that the neighboring frequency is selected as the redistribution target.

Alternatively, RedistributionInterFreqInfo may include a list (redistributionNeighCellList) of cells in the neighboring frequency, and a parameter (redistributionFactorCell) that determines the probability of being selected as the redistribution target for each cell. The list (redistributionNeighCellList) of cells includes an information element (RedistributionNeighCell) for each cell. The information element (RedistributionNeighCell) for each cell includes a physical cell identifier (PhysCellId) of a corresponding cell and the parameter (redistributionFactorCell) that determines the probability.

In Step S50, the UE 100 determines whether or not a continuous trigger or a paging trigger has occurred as a trigger of inter frequency redistribution. The continuous trigger is such a trigger that a trigger occurs every time a timer referred to as T360 expires. The paging trigger is such a trigger that a trigger occurs every time a predetermined paging message is received.

Specifically, when all of the conditions of a) to c) below are satisfied, and any one conditions of A) to C) below is satisfied, the UE 100 determines "YES" in Step S50; otherwise, the UE 100 determines "NO" in Step S50.
 a) redistributionServingInfo is included in SIB type A.
 b) redistributionInterFreqInfo is included in SIB type B.
 c) Dedicated priority is not configured for the UE 100.
 A) T360 is not running, and RedistrOnPagingOnly is not present in SIB type A.
 B) T360 expires, and redistrOnPagingOnly is not present in SIB type A.
 C) redistributionIndication is included in the paging message received by the UE 100.

RedistrOnPagingOnly indicates that inter frequency redistribution is triggered only by paging, and is an information element of SIB type A. redistributionIndication indicates triggering of inter frequency redistribution, and is an information element of the paging message.

When it is determined "YES" in Step S50, in Step S60, the UE 100 performs inter frequency redistribution.

Here, based on the RNA configured by the RRC release message and the redistribution parameter broadcast from the network (gNB 200), the UE 100 selects the redistribution target among the cells included in the RNA. In other words, the UE 100 excludes cells not included in the RNA configured for the UE 100 from candidates of the redistribution target.

When the configuration of the RNA in SuspendConfig includes a cell identifier list, the UE 100 selects the redistribution target with cells having cell identifiers included in the cell identifier list as candidates. In contrast, when the configuration of the RNA in SuspendConfig includes a RAN area identifier list, the UE 100 selects the redistribution target with cells having RAN area identifiers included in the RAN area identifier list as candidates.

In inter frequency redistribution, the UE 100 generates a list of candidates of the redistribution target, based on results of inter frequency measurement and the redistribution parameter. The list of candidates of the redistribution target is a list of carrier frequencies, or a list of cells belonging to the carrier frequency.

When the UE 100 generates a cell list as a candidate list of the redistribution target, and the cell detected through the inter frequency measurement is a cell included in the RNA configured for the UE 100, the UE 100 adds the cell to the candidate list. When the UE 100 generates a carrier frequency list as a candidate list of the redistribution target, and the cell detected through the inter frequency measurement is a cell included in the RNA configured for the UE 100, the UE 100 adds the carrier frequency to which the cell belongs, to the candidate list.

Then, the UE 100 selects the redistribution target (carrier frequency or cell) from the generated candidate list, based on the identifier of the UE 100. The identifier of the UE 100 is, for example, an international mobile subscriber identity (IMSI).

Figure 8:
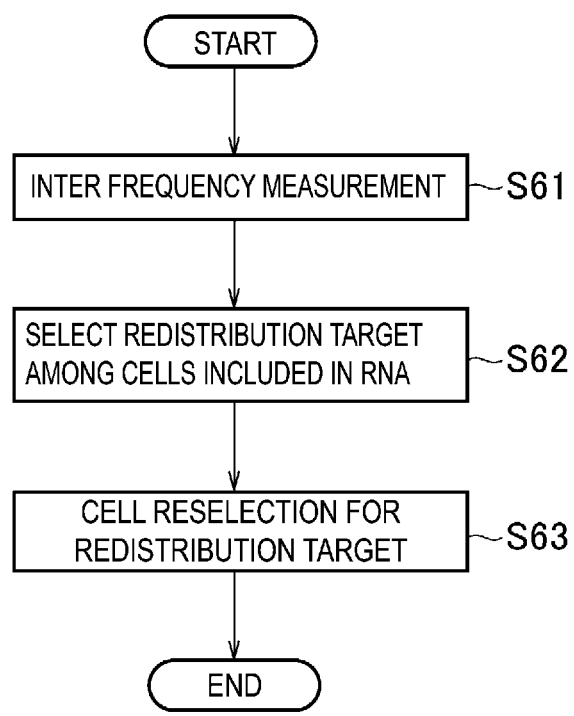
FIG. 8 is a diagram illustrating operation of inter frequency redistribution in Step S60 of FIG. 6.

FIG. 8 is a diagram illustrating operation of inter frequency redistribution in Step S60 of FIG. 6.

As illustrated in FIG. 8, in Step S61, the UE 100 performs inter frequency measurement. Specifically, the UE 100 measures a reception state (received power or received quality) for each neighboring cell belonging to a carrier frequency different from the carrier frequency of the current serving cell.

In Step S62, based on the RNA configured by the RRC release message and the redistribution parameter broadcast from the network (gNB 200), the UE 100 selects the redistribution target configured with the highest priority in cell reselection among the cells included in the RNA. Note that the UE 100 starts the timer T360 when selecting the redistribution target. The value of T360 is specified as an information element of SIB type A.

Redistribution target selection is executed as follows.

First, the UE 100 generates a list of candidates of the redistribution target. Specifically, the UE 100 generates a sorted list of one or a plurality of redistribution targets, and generates redistrFactor [j] for each candidate entry [j]. The entry is added in index order sequentially increasing from index 0.

Here, when the UE 100 generates a candidate list of the redistribution target, the RNA configured by the RRC release message is considered as follows.

Regarding the serving frequency, the UE 100 configures redistributionFactorServing, by configuring the serving cell to redistrFactor [0] if redistributionFactorCell is included, or otherwise configuring the serving frequency to redistrFactor [0].

When redistributionNeighCellList is configured, regarding each entry of the inter frequency (each entry in InterFreqCarrierFreqList and its subsequent InterFreqCarrierFreqListExt), the UE 100 selects a cell ranked as the best cell in the carrier frequency as a candidate of the redistribution target, and configures corresponding redistributionFactorCell to redistrFactor [j]. Here, only when the cell ranked as the best cell is a cell included in the RNA configured for the UE 100, the UE 100 may select the cell ranked as the best cell as a candidate of the redistribution target. When the cell ranked as the best cell is not the cell included in the RNA configured for the UE 100 but a cell ranked second is a cell included in the RNA configured for the UE 100, the UE 100 may select the cell ranked second as a candidate of the redistribution target.

When redistributionFactorFreq is configured, regarding each entry of the inter frequency (each entry in InterFreqCarrierFreqList and its subsequent InterFreqCarrierFreqListExt), if at least one cell of the carrier frequency satisfies a selection criterion (S-criterion), the UE 100 selects the carrier frequency as a candidate of the redistribution target, and configures corresponding redistributionFactorFreq to redistrFactor [j]. Here, only when the cell that satisfies the selection criterion (S-criterion) is a cell included in the RNA configured for the UE 100, the UE 100 may select the carrier frequency as a candidate of the redistribution target.

Second, the UE 100 selects the redistribution target out of the candidate list of the redistribution target. For example, the UE 100 selects the redistribution target as follows.

When Math. 1 below is satisfied, the UE 100 selects the frequency or the cell corresponding to redistrFactor [0] as the redistribution target.

$$ueID \leq 200 \cdot redistrRange[0] \qquad \text{[Math. 1]}$$

When Math. 2 below is satisfied, the UE 100 selects the carrier frequency or the cell corresponding to redistrFactor [i] as the redistribution target.

$$200 \cdot \sum_{j=0}^{j=i-1} redistrRange[j] < \qquad \text{[Math. 2]}$$
$$ueID \leq 200 \cdot \sum_{j=0}^{j=i} redistrRange[j]$$

Here, ueID is determined based on the IMSI of the UE 100 according to Math. 3 below.

$$ueID = (IMSI \bmod 100) \cdot 2 + 1 \qquad \text{[Math. 3]}$$

Note that when there is no redistribution candidate other than the serving frequency or the serving cell, redistrRange [0]=1. When there is a redistribution candidate other than the serving frequency or the serving cell, redistrRange [i] of the carrier frequency or the cell is determined according to Math. 4 below.

$$redistrRange[i] = \frac{redistrFactor[i]}{\sum_{j=0}^{j=(maxCandidates-1)} redistrFactor[j]} \qquad \text{[Math. 4]}$$

Here, maxCandidates is a total number of carrier frequencies or cells having valid redistrFactor [j].

Note that, when the UE 100 cannot select the redistribution target out of the candidate list of the redistribution target, the UE 100 may stop inter frequency redistribution processing, and fall back to regular cell reselection processing.

In Step S63, the UE 100 configures the highest priority of cell reselection for the selected redistribution target, and thereby performs cell reselection for the redistribution target (specifically, camps on the cell corresponding to the redistribution target). As a result, the UE 100 can perform cell reselection for the cell included in the RNA configured for the UE 100, and therefore occurrence of the RNA update processing can be prevented.

Modifications

In the embodiment described above, when each cell detected through the inter frequency measurement, specifically the cell satisfying the selection criterion (S-criterion), is a cell not included in the RNA, the UE 100 performs first exceptional operation of selecting the current serving cell as the redistribution target. Specifically, the UE 100 does not perform cell reselection.

However, when each cell detected through the inter frequency measurement, specifically the cell satisfying the selection criterion (S-criterion), is a cell not included in the RNA, the UE 100 may perform second exceptional operation of selecting the redistribution target regardless of the RNA. Specifically, the UE 100 falls back to inter frequency redistribution similar to that of related art and selects the redistribution target. Note that whether the first exceptional operation is performed or the second exceptional operation is performed may be configured from the gNB 200 to the UE 100.

Other Embodiments

A program causing a computer to execute each of the processes performed by the UE 100 or the gNB 200 may be provided. The program may be recorded on a computer readable medium. The program can be installed in a computer by using the computer readable medium. Here, the computer readable medium on which the program is recorded may be a non-transitory recording medium. Although the non-transitory recording medium is not limited to a particular one, a recording medium, for example, a CD-ROM, a DVD-ROM, or the like may be adopted.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the gist.

The invention claimed is:

1. A cell reselection method that allows a user equipment to perform cell reselection of reselecting a cell to be used as a serving cell, the cell reselection method comprising:
    transitioning from a radio resource control (RRC) connected state to an RRC inactive state in response to receiving a message from a network, the message including a configuration of a radio access network (RAN) notification area in which paging for the user equipment is performed; and
    after the transitioning to the RRC inactive state, selecting, among cells included in the RAN notification area, a redistribution target configured with a highest priority in the cell reselection, based on the RAN notification area configured according to the message and a redistribution parameter broadcast from the network.

2. The cell reselection method according to claim 1, wherein
    the selecting the redistribution target includes excluding a cell not included in the configured RAN notification area from candidates of the redistribution target.

3. The cell reselection method according to claim 1, wherein
    the configuration of the RAN notification area includes a cell identifier list of the cells constituting the RAN notification area, and
    the selecting the redistribution target includes selecting the redistribution target among candidates of cells having cell identifiers included in the cell identifier list respectively.

4. The cell reselection method according to claim 1, wherein
    the configuration of the RAN notification area includes a RAN area identifier list of RAN areas constituting the RAN notification area, and
    the selecting the redistribution target includes selecting the redistribution target among candidates of cells having RAN area identifiers included in the RAN area identifier list respectively.

5. The cell reselection method according to claim 1, further comprising
    performing inter frequency measurement, wherein
    the selecting the redistribution target includes, when a cell detected through the inter frequency measurement is a cell of the cells included in the configured RAN notification area, adding the detected cell or a carrier frequency to which the detected cell belongs, to a candidate list of the redistribution target.

6. A user equipment that performs cell reselection of reselecting a cell to be used as a serving cell, the user equipment comprising:
    a controller configured to cause the user equipment to transition from a radio resource control (RRC) connected state to an RRC inactive state in response to the user equipment receiving, from a network, a message including a configuration of a radio access network (RAN) notification area in which paging for the user equipment is performed, wherein
    after the transition to the RRC inactive state, the controller selects, among cells included in the RAN notification area, a redistribution target configured with a highest priority in the cell reselection, based on the RAN notification area configured according to the message and a redistribution parameter broadcast from the network.

7. The user equipment according to claim 6, wherein
    the selecting of the redistribution target by the controller includes excluding a cell not included in the configured RAN notification area from candidates of the redistribution target.

8. The user equipment according to claim 6, wherein
    the configuration of the RAN notification area includes a cell identifier list of the cells constituting the RAN notification area, and
    the selecting of the redistribution target by the controller includes selecting the redistribution target among candidates of cells having cell identifiers included in the cell identifier list respectively.

9. The user equipment according to claim 6, wherein
the configuration of the RAN notification area includes a RAN area identifier list of RAN areas constituting the RAN notification area, and
the selecting of the redistribution target by the controller includes selecting the redistribution target among candidates of cells having RAN area identifiers included in the RAN area identifier list respectively.

10. The user equipment according to claim 6, wherein
the controller performs inter frequency measurement, wherein
the selecting of the redistribution target by the controller includes, when a cell detected through the inter frequency measurement is one of the cells included in the configured RAN notification area, adding the detected cell or a carrier frequency to which the detected cell belongs, to a candidate list of the redistribution target.

* * * * *